(12) United States Patent
Fielder (10) Patent No.: US 10,384,704 B2
(45) Date of Patent: Aug. 20, 2019

(54) STEERING RESPONSIVE SPEED-CONTROLLED BUGGY

(71) Applicant: Allen Engineering Corporation, Paragould, AR (US)

(72) Inventor: Jeffrey Lynn Fielder, Jonesboro, AR (US)

(73) Assignee: Allen Engineering Corporation, Paragould, AR (US)

(*) Notice: Subject to any disclaimer, the term of this patent is extended or adjusted under 35 U.S.C. 154(b) by 0 days.

(21) Appl. No.: 15/981,296

(22) Filed: May 16, 2018

(65) Prior Publication Data

US 2018/0346007 A1 Dec. 6, 2018

Related U.S. Application Data

(60) Provisional application No. 62/514,236, filed on Jun. 2, 2017.

(51) Int. Cl.
| | |
|---|---|
| *B62D 51/00* | (2006.01) |
| *B60K 1/00* | (2006.01) |
| *B62B 5/00* | (2006.01) |
| *B60P 1/16* | (2006.01) |
| *B60P 1/28* | (2006.01) |
| *B60P 3/16* | (2006.01) |
| *B62B 3/08* | (2006.01) |
| *B62B 3/00* | (2006.01) |
| *B62D 1/12* | (2006.01) |

(52) U.S. Cl.
CPC .............. *B62B 5/0069* (2013.01); *B60K 1/00* (2013.01); *B60P 1/16* (2013.01); *B60P 1/28* (2013.01); *B60P 3/16* (2013.01); *B62B 3/001* (2013.01); *B62B 3/08* (2013.01); *B62B 5/003* (2013.01); *B62D 1/12* (2013.01); *B62D 51/00* (2013.01)

(58) Field of Classification Search
CPC ...... B62D 51/002; B62D 51/02; B60K 17/10; B60K 17/105; B60K 17/356
USPC .............. 180/19.1, 19.2, 305, 306, 307, 308
See application file for complete search history.

(56) References Cited

U.S. PATENT DOCUMENTS

| | | | | |
|---|---|---|---|---|
| 5,913,802 | A * | 6/1999 | Mullet | ............... A01D 34/6806 180/19.3 |
| 5,984,031 | A * | 11/1999 | Velke | .................. A01D 34/001 180/19.3 |

(Continued)

*Primary Examiner* — Jeffrey J Restifo
(74) *Attorney, Agent, or Firm* — Stephen D. Carver (57) ABSTRACT

A steerable, self-propelled cart for safely delivering heavy loads, such as concrete, within job sites with unlevel, irregular, or sloped terrain. A cargo bucket is tiltable over front drive wheels for transporting and dumping cargo. Hydraulic drive motors driven by a hydraulic pump propel rear wheels at a selectable speed. Steering handlebars rotate a steering column that turns the rear wheels. A throttle cable extending from the handlebars controls the throttle setting by pivoting a throttle lever mounted on the hydraulic pump. Limiting linkages extend from flanges on an anchor bracket secured to the steering column to a bridge on the throttle lever. As the steering column rotates, the limit linkages are wound partially about it, pivoting the throttle lever by pulling on the bridge, reducing pump speed. Heavy steering displacements will retract the throttle lever to reduce cart speed notwithstanding the previous speed setting chosen by the operator via the cable.

12 Claims, 12 Drawing Sheets

(56) References Cited

U.S. PATENT DOCUMENTS

| | | | | |
|---|---|---|---|---|
| 6,170,584 B1 * | 1/2001 | Mistry | ................. | B62D 11/183 |
| | | | | 180/421 |
| 6,311,487 B1 * | 11/2001 | Ferch | .................... | B60K 17/08 |
| | | | | 60/413 |
| 6,321,866 B1 * | 11/2001 | Prohaska | ................ | F16H 48/18 |
| | | | | 180/197 |
| 6,491,122 B2 * | 12/2002 | Leitner | ................. | B62K 5/025 |
| | | | | 180/216 |
| 6,604,757 B1 * | 8/2003 | Huang | .................... | B62D 1/12 |
| | | | | 280/778 |
| 6,857,494 B2 * | 2/2005 | Kobayashi | ............. | B62D 12/00 |
| | | | | 180/235 |
| 6,913,103 B2 * | 7/2005 | Kitasaka | ............. | B60K 17/105 |
| | | | | 180/306 |
| 7,025,157 B2 * | 4/2006 | Lindsay | ............... | B62B 3/0612 |
| | | | | 180/19.1 |
| 7,108,096 B1 * | 9/2006 | Oxley | ..................... | B62D 3/12 |
| | | | | 180/197 |
| 7,165,643 B2 * | 1/2007 | Bozem | ................. | B66F 17/003 |
| | | | | 180/19.2 |
| 7,740,099 B2 * | 6/2010 | Field | ..................... | A63C 17/01 |
| | | | | 180/282 |
| 7,954,573 B2 * | 6/2011 | Jessen | ................. | B62D 11/006 |
| | | | | 180/6.32 |
| 8,886,408 B2 * | 11/2014 | Ellis | .................... | B62D 5/0463 |
| | | | | 180/446 |
| 9,623,903 B2 * | 4/2017 | Cook | ...................... | B62D 7/08 |
| 9,771,967 B2 * | 9/2017 | Papke | .................... | F16C 1/102 |
| 2004/0158375 A1 | 8/2004 | Tsutsumi et al. | | |
| 2006/0260859 A1 | 11/2006 | Kasten et al. | | |
| 2009/0138168 A1 | 5/2009 | Labuhn et al. | | |
| 2012/0136539 A1 | 5/2012 | Bryant et al. | | |

* cited by examiner

STEERING RESPONSIVE SPEED-CONTROLLED BUGGY

CROSS-REFERENCE TO RELATED APPLICATIONS

This utility conversion patent application is based upon, and claims priority from, prior U.S. Provisional Patent Application Ser. No. 62/514,236, filed Jun. 2, 2017, and entitled "Steering Responsive Speed-Controlled Buggy" by inventor Jeffrey Lynn Fielder.

BACKGROUND OF THE INVENTION

1. Field of the Invention

This invention relates generally to wheeled vehicles and to steering and speed control systems associated therewith. More particularly, the present invention relates to self-propelled, wheeled vehicles, particularly carts, wagons and other hauling or moving devices, that exhibit a tendency to tip over when traveling too fast.

2. Description of the Prior Art

Many relatively small vehicles and carts are used to transport moderate to heavy loads between work stations in typical manufacturing environments. In the concrete industry and trades, for example, small carts or wagons are often employed to move multiple, limited batches of concrete mix to a pour site from a concrete delivery truck This type of cart or wagon is needed because large and heavy concrete mixer trucks cannot access the work site in many job locations, because of restricted access and narrow or obstructed pathways. Thus several small batches of concrete must be transported by carts or wagons to the pour site.

However, the ground around most construction sites is irregular and unlevel. Access passageways are often riddled with potholes, puddles and other obstacles. Typical job sites can be strewn with rocks and debris, and the trail leading to the pour site may be sloped and otherwise haphazardly defined. Relatively small, self propelled carts or wagons have the appropriate dimensional clearance, but they can be tipped over when traversing irregular ground, especially when driven too fast. The danger is aggravated by the fact that the irregular pathways leading to the pour site require substantial steering efforts, and too much deflection of the steered wheels can aggravate the propensity for tipping. Even on flat concrete surfaces stability can be a problem. When carts are loaded irregularly with heavy loads, imbalance may cause tilting and even tipping over. Moreover, shifting loads that occur suddenly can destabilize older conventional carts and buggies. It is also recognized in the art that with older buggies, centrifugal forces experienced at higher speeds in tight turns can cause rollovers. Furthermore, centrifugal forces developed with older conventional buggies from higher speeds in tight turns can cause the operator to lose balance and/or be thrown from the operators platform.

Accordingly, there is a need in the construction arts for an improved concrete delivery vehicle with a reduced propensity to tip over. Stated another way, there is a need for a reliable and simple batch delivery system that automatically slows the cart or wagon during extreme turns to maintain stability.

Prior art speed control devices that sense steering angles or deflection are known in the art.

U.S. Pat. No. 6,491,122 issued Dec. 10, 2002 shows an electronic speed control for vehicles. A propulsion system is switchable between two modes, one of which allows a higher maximum speed than the other. A steering angle sensor and a tilt switch prevent the user from selecting the high-speed mode while steering sharply or while going down or across steep slopes.

U.S. Pat. No. 6,170,584 issued Jan. 9, 2001 illustrates a speed control system for a tracked vehicle having an engine-driven hydraulic steering pump which drives a hydraulic steering motor. The steering pump is responsive to an operator manipulated steering wheel. The steering motor provides an input to a differential track drive mechanism which responds to manipulation of the steering wheel and drives left and right tracks to turn the vehicle. A control unit calculates a motor speed threshold value as a function of sensed engine speed and steering control signals, and generates a fault signal as a function of a relationship between the steering motor speed signal and a motor speed threshold value. The fault signal may be processed to safely limit speed.

United States Patent Application No. 20040158375 published Aug. 12, 2004 discloses a motion control apparatus for automotive vehicles that limits speed by monitoring the vehicle steering angle.

United States Patent Application No. 20060260859 published Nov. 23, 2006 discloses a drive speed control system for vehicles with rear wheel drive and steerable front wheels. A control unit insures that a front/rear wheel speed ratio is a linear trigonometric function of a sensed steering angle signal. Speed is thus relative to the sensed steering angle.

United States Patent Application No. 20090138168 published May 28, 2009 discloses a method for operating a cruise control system that identifies certain low speed environments, like parking lots, where usage of the cruise control system is usually inappropriate. The method compares a sensed steering wheel position to a steering wheel threshold to determine if the vehicle is operating in an inappropriate, low speed environment and, if so, disables the cruise control system accordingly.

United States Patent Application No. 20120136539 published May 31, 2012 illustrates an electronically controlled, speed limiting system for turf maintenance machines. In this device a hydraulic pump operating a traction motor has its output varied by an actuator that is connected to a controller. The controller monitors a wheel speed sensor. A brake is activated by the controller if the wheel speed sensor detects wheel slipping or spinning. A steering position sensor signal is used by the controller to modify brake activation during machine turns.

U.S. Pat. No. 7,108,096 issued Sep. 19, 2006 discloses a control system for use with a self-propelled, steerable vehicle, such as a lawn mower or the like which limits speed by interconnection with a steering system. The system slows vehicle speed when turns are made beyond a predetermined range and the speed equals or exceeds a predetermined level, as determined by a speed control device connected to a speed control linkage. This slowing results in increased traction for achieving tighter turns, and it also improves dynamic stability. Two different types of rack-and-pinion steering systems capable of being used with the control system are illustrated.

However, there exists a demand for a speed control device for a front-wheel drive cart or buggy that senses steering displacements and directly limits vehicle speed in proportion thereto. For cost reduction and simplicity, as well as reliability, a desirable system should avoid the use of computer parts, and a simple analog system is preferred. Despite the analog simplicity, the device must function safely in hostile environments in potentially dangerous conditions.

SUMMARY OF THE INVENTION

A self-propelled, steerable batch cart for delivering loads of materials or supplies, such as raw concrete mix, at a construction job site. The cart comprises a rigid chassis supported by front, hydraulically powered drive wheels, and a pair of rear steering wheels. A conventional internal combustion engine, with its own throttle control, drives a hydraulic pump that powers hydraulic motors for driving the cart. A cargo bucket pivotally mounted over the chassis can be hydraulically displaced between a rest or load position and a tilted, load discharge position.

A steering system comprising handle bars accessible from an operator position can be grasped and turned for steering the rear wheel assembly to aim the cart. Speed control is established by a hand-grip-controlled, operating cable extending from the handle bars to a throttle lever linked to the hydraulic pump. The throttle lever can be pivoted by the cable between speed increasing and speed decreasing positions. Special wire-like limit linkages extend from an anchor bracket on the steering column to the throttle lever. When predetermined steering limits are reached, at least one of the limit linkages are retracted, pulling the throttle lever to decrease speed.

Thus a basic object of the invention is to provide a self propelled buggy or cart that is stable and safe when heavily loaded.

Another fundamental object is to provide a hydrostatic, concrete batch delivery cart or buggy that is stable and safe.

Another basic object is to automatically limit speed in a buggy or cart in response to predetermined excessive steering displacements.

A related object is to provide a buggy or cart of the character described that remains stable during sharp turns, even when heavily loaded.

Another object is to provide such a cart that can safely maneuver over rough and irregular terrain that is characteristic of typical construction sites.

It is also an object to provide a buggy or cart for construction use wherein over-speed conditions that might result in tilting or rolling are inherently resisted.

Another basic object is to provide a self propelled, cart that resists overspeed conditions when sharply turning over sloped and irregular terrain.

Yet another object is to provide a self-propelled buggy or cart of the character described that can safely traverse sloped, irregular pathways strewn with debris and obstacles.

It is also a goal to provide a rear-steering cart that accomplishes the objects discussed above.

These and other objects and advantages will appear or become apparent in the course of the following descriptive sections.

BRIEF DESCRIPTION OF THE DRAWINGS

In the accompanying drawings, which form a part of the specification and which are to be construed in conjunction therewith, and wherein like reference numerals have been employed where reasonably possible to indicate like parts in the various views.

DETAILED DESCRIPTION OF THE PREFERRED EMBODIMENTS

Figure 1:
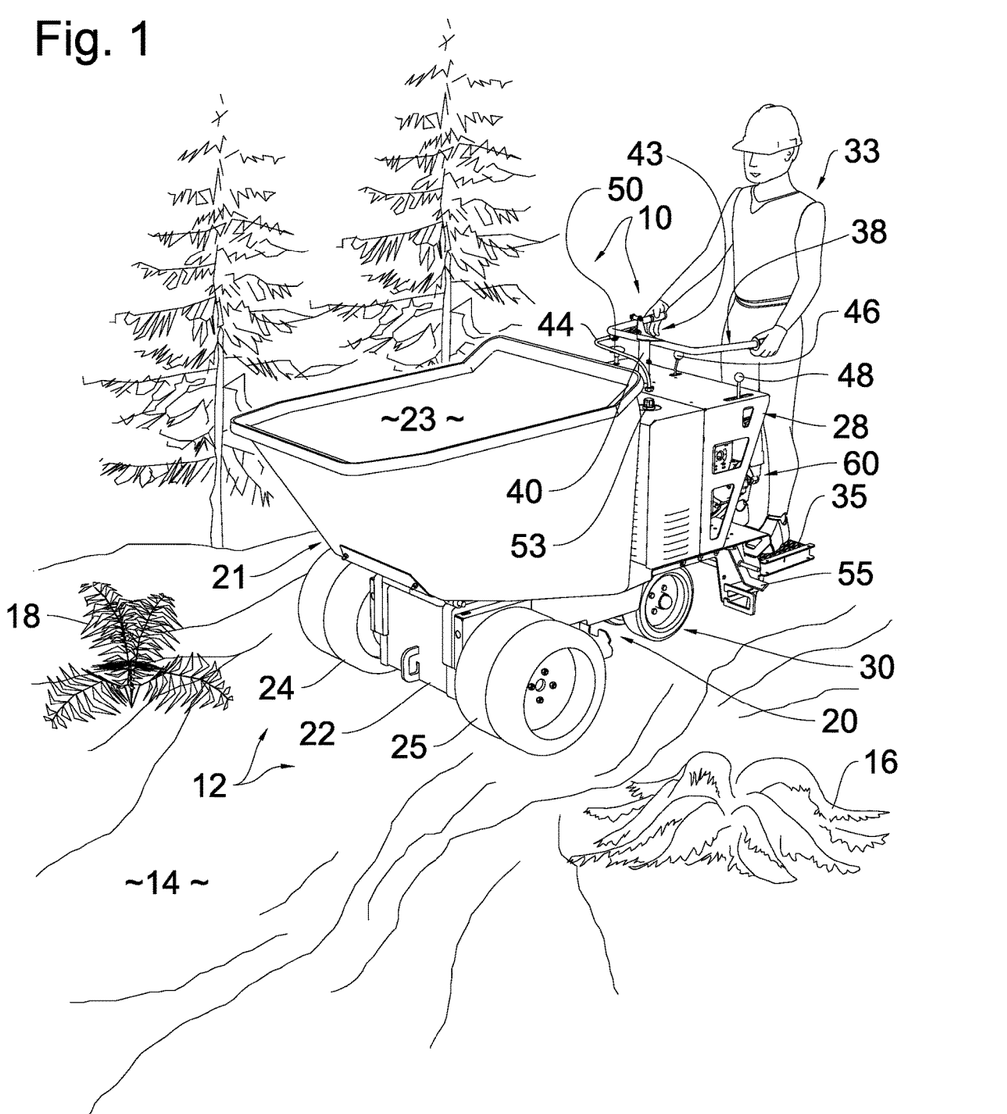
FIG. 1 is a pictorial view of a batching cart constructed in accordance with the best mode of the invention, showing it deployed in a construction zone over rough terrain and upon an irregular, sloped pathway that is partially obstructed by debris.

With initial reference now directed to FIG. 1 of the appended drawings, a self-propelled, steerable cart or buggy constructed in accordance with the best mode of the invention has been generally designated by the reference numeral 10. (For purposes of the disclosure the terms "cart" and/or "buggy" are used interchangeably.) Cart 10 is adapted to be deployed within a construction zone or work site 12, for moving materials or supplies or tools to and from the work site over an available pathway such as trail 14. The cart 10 is especially adapted for hauling small batches of liquid concrete to areas that cannot be safely or reached by a much larger and heavier concrete mixing trucks. As appreciated from FIG. 1, work site 12 is unlevel, and the course and irregular trail or pathway 14 is sloped and rough. There is debris 16, 18 scattered about. Therefore the cart 10 must be stable when heavily loaded, and it must be able to safely accommodate irregular and unlevel pathways while moving heavy loads. To this effect it has been determined that unfortunate accidents involving tipping or rolling over are often caused, at least in part, by excessive speed. Further, speed is a particularly destabilizing factor when steering at extreme angles.

Figure 2:
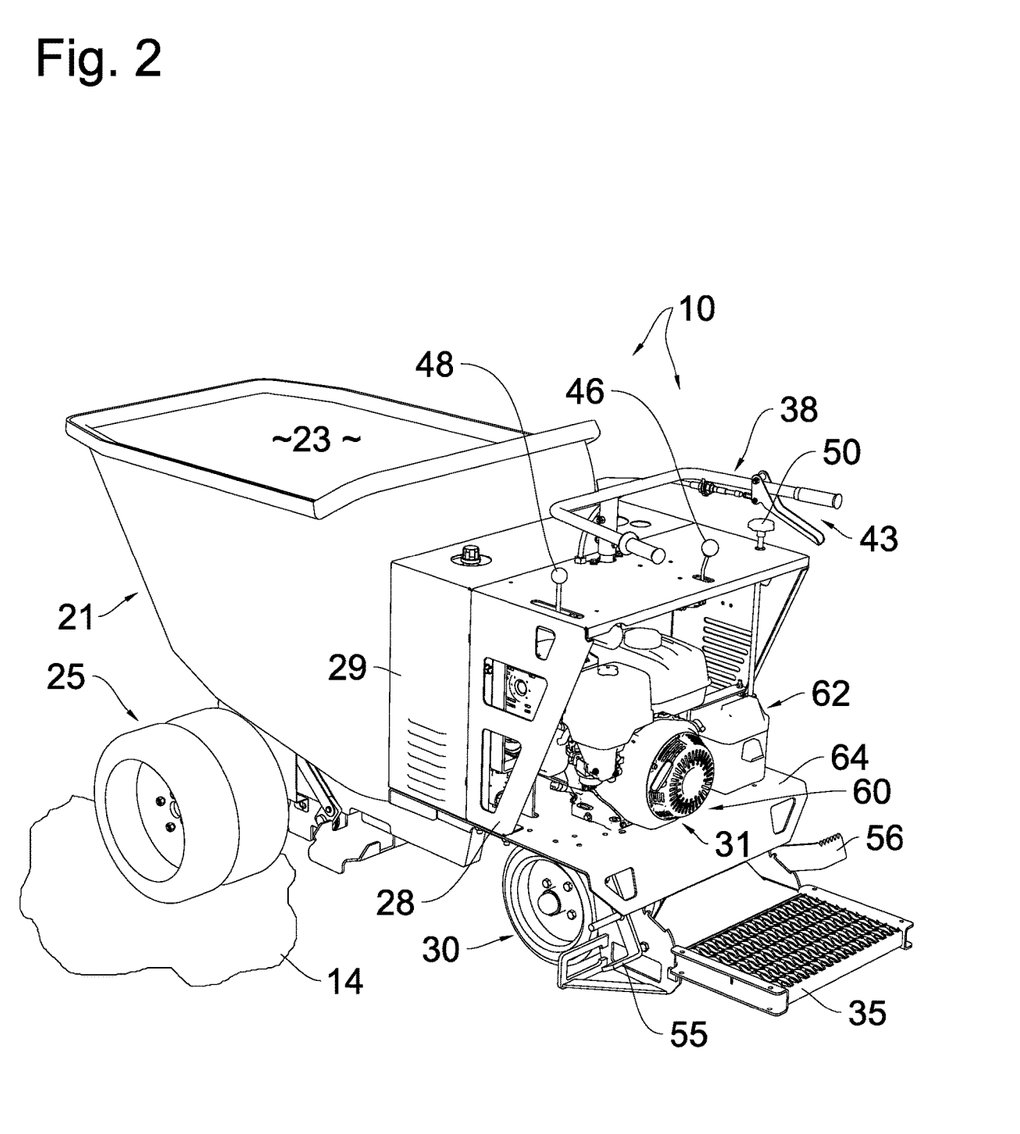
FIG. 2 is a fragmentary, left rear isometric view of the cart.
Figure 3:
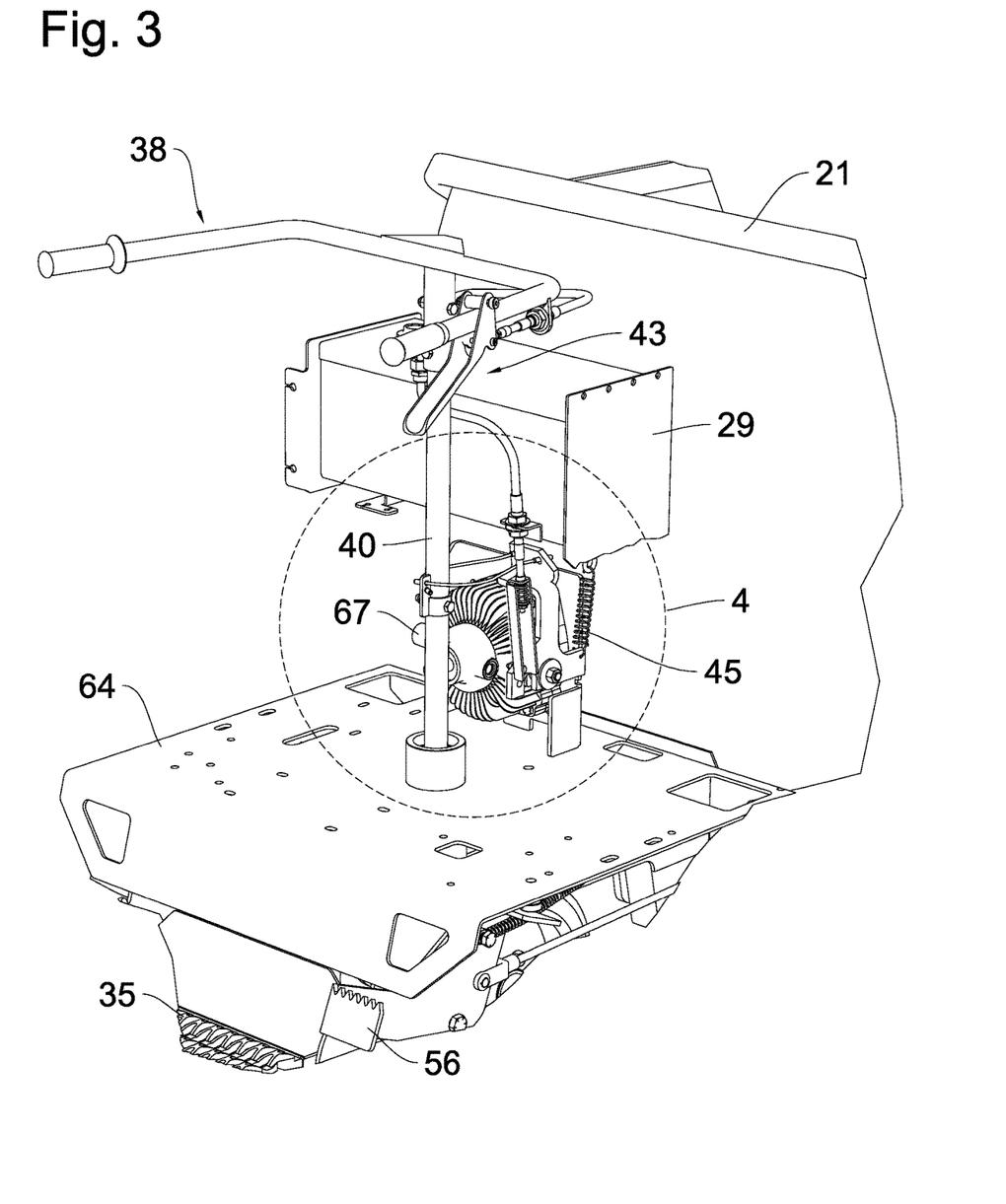
FIG. 3 is an enlarged, fragmentary isometric view of the right rear of the cart, showing the control platform and the steering system.
Figure 4:
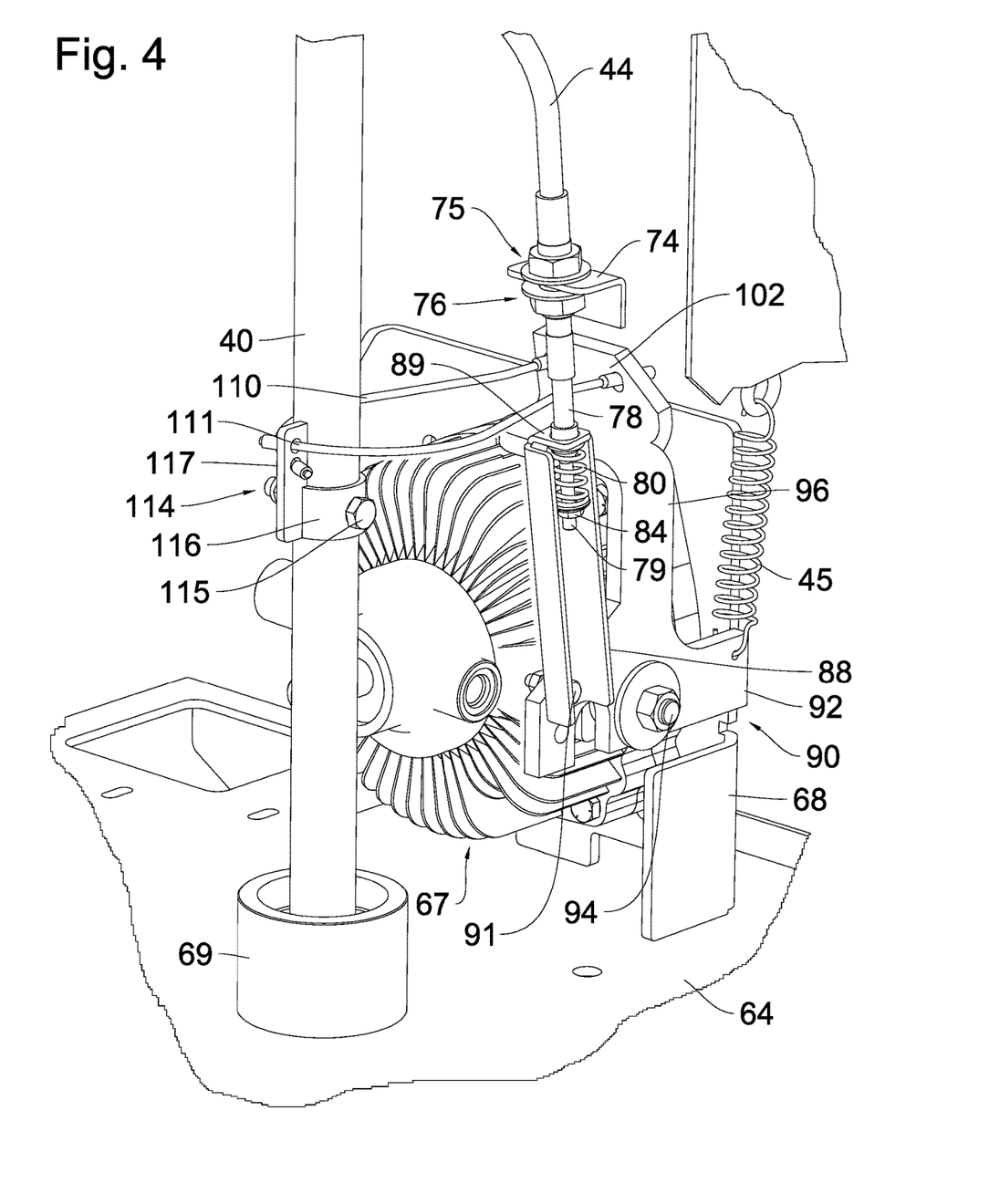
FIG. 4 is an enlarged, fragmentary isometric view of the steering column area and the hydraulic drive pump, derived from circled region "4" in FIG. 3.

Cart 10 comprises a rigid chassis 20 supporting a front motor housing, generally designated by the reference numeral 22. Chassis 20 supports a cargo bucket 21 that is tiltable over the front drive wheels 24 and 25 for conveniently dumping cargo from bucket interior 23. Bucket 21 is normally disposed in a horizontal position for transport or loading, and it can be hydraulically tilted for material discharge. There are a pair of conventional hydraulic drive motors 27 (i.e., schematically shown in FIG. 12) within housing 22 for driving the front drive wheels 24, 25. An elevated engine shroud 28 covers a conventional, preferably gasoline powered drive engine 60 (FIGS. 1, 2) that powers a suitable hydraulic pump 67 for powering conventional hydraulic motors within housing 22 that propel the front drive wheels 24, 25. Pump 67 (FIG. 3) is mounted over plate 64 by a rigid support plate 68 (FIG. 4). A generally cubicle housing 29 (FIG. 3) is disposed between shroud 28 and the bucket 21. In use, a human operator 33 (FIG. 1) stands atop a rear support platform 35 to drive the cart 10. The operator 33 is shown grasping the steering system comprising handlebars 38 that rotate a rigid, elongated steering column 40 for steering. Steering is accomplished with at least one steered wheel, preferably a pair of steered wheels 30. Linkage discussed hereinafter turns the rear wheels 30 for steering. At present, the caster angle of the rear wheels, whether positive or negative, has been observed to affect stability, depending upon the type of terrain involved. A hand-operated grip 43 controls the throttle lever 90 via a throttle cable 44 (i.e., FIG. 4). The throttle lever 44 is biased towards the rest or idle position by a return spring 45 (FIGS. 4, 5).

Figure 5:
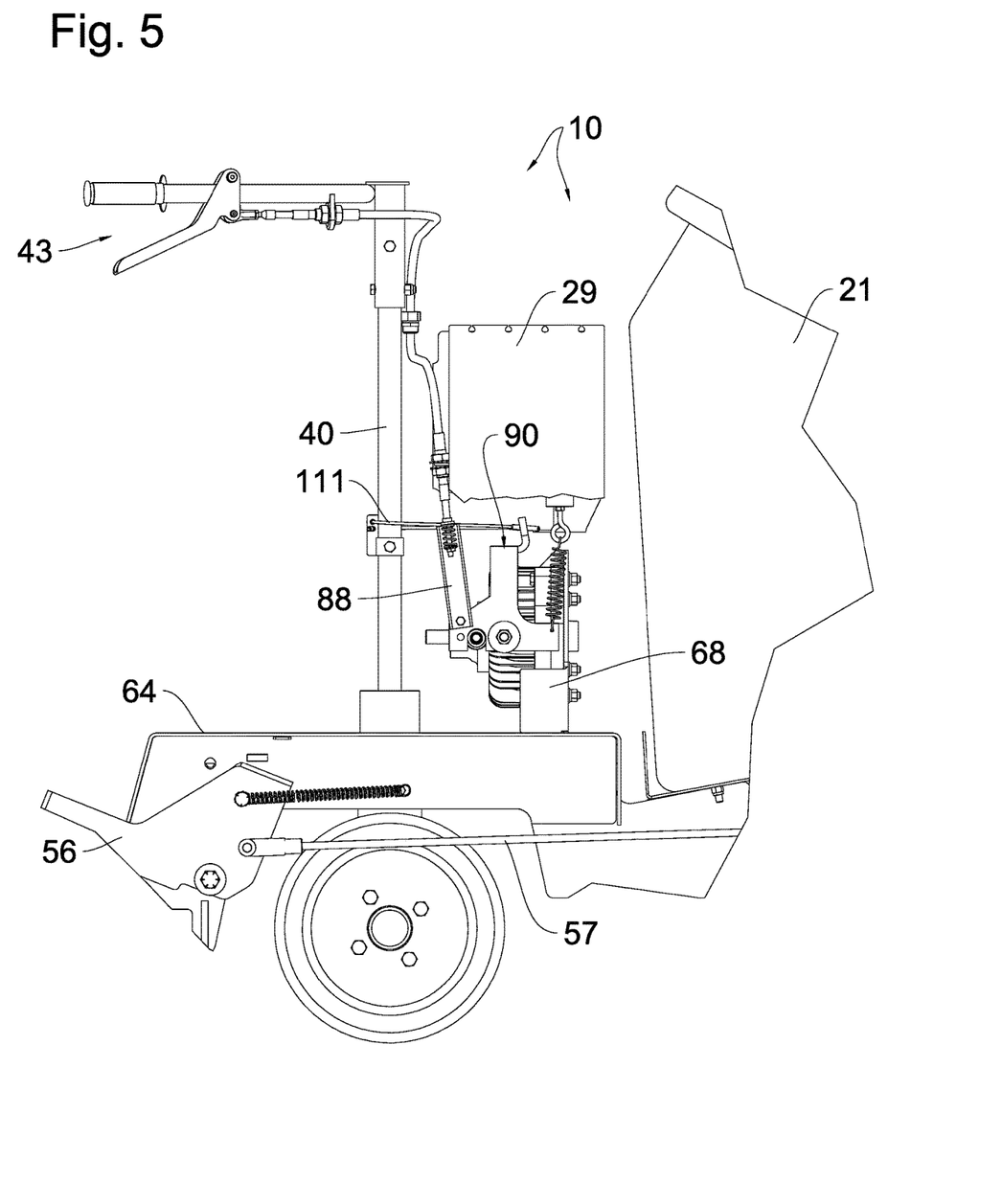
FIG. 5 is a fragmentary side elevational view taken generally from a position to the right of FIG. 3 and looking towards the steering column, showing the throttle lever in a "normal" position, at zero speed, with the steering aimed straight.

As illustrated in FIG. 1, the operator 33 is shown grasping the hand grip throttle control with his right hand. A travel-direction lever 46 atop engine shroud 28 leading to the hydraulic pump selects forward or reverse cart travel directions. A similar, spaced-apart lever 48 controls the bucket 21, which is powered by a conventional hydraulic cylinder for deflection and dumping. Bucket 21 may be activated with a left foot lever 55 (i.e., FIG. 2). A foot-operated brake pedal 56 on the opposite side of the cart controls brakes through linkage 57 (i.e., FIG. 5). Also seen atop the engine shroud 28 is a brake lock 50 that locks the brake once activated with the brake foot pedal 56 (FIG. 2) on the lower right side of the cart. Brake pedal 56 is normally biased to the rest position by a spring 58 (i.e., FIG. 6). Hydraulic oil is inputted to the reservoir via inlet 53 (FIG. 1).

Cart 10 is powered by a conventional internal combustion engine 60 (FIG. 1) enclosed by shroud 28 (FIG. 1) that is secured to a mounting platform 64 supported by the cart chassis 20. Engine 60, which can be gasoline, gas (i.e., propane) or diesel powered, is mounted next to a battery box (not shown) to the rear of the steering column 40. A conventional universal coupling (not shown) is connected between the internal combustion engine 60 and the input of the hydraulic pump 67 for generating hydraulic pressure. Hydraulic motors (not shown) connected via suitable hydraulic circuitry to the pump 67 are employed for the drive wheels 24 and 25.

With primary emphasis directed now to FIGS. 4-7, the steering handlebars 38 rotate the steering column 40, which is disposed substantially vertically relative to the platform 64, coaxially passing through a protective, tapered roller bearing 69 to the underside of the cart. Shaft 40 controls the steering of the rear wheels 30 by mechanical interconnection with a lower trunnion 70 (i.e., FIG. 7). Thus, as the handlebars 38 are grasped and turned by an operator 33 (FIG. 1), the rear wheels are turned and rear steering is achieved. It is to be noted that the hand-operated grip 43, mounted on the right side of the handlebars, controls the throttle. Grip 43 can be hand-squeezed by the operator for speeding up the cart, changing the position of the hand grip 43 from that in FIG. 3 to the maximum speed position seen in FIG. 7. Throttle cable 44 establishes a mechanical link between the throttle control and the hydraulic pump that powers at least one hydraulic drive motor. Cable 44 is connected via fitting 75 to one side of a support bracket 74 (FIG. 4), the opposite side of which receives a fitting 76 axially connecting a cable terminus 78 to the cable 44. Terminus 78 has a threaded end 79 that captivates a compression spring 80 with a suitable lock nut 84. Spring 80 and the terminus 78 are disposed in the upper end of a substantially channel-like linkage 88 (FIG. 4) whose upper end 89 is penetrated by terminus 78, and whose lowermost extreme is pivoted to a throttle control lever 90 via fastener 91. Linkage 88 thus protectively shrouds spring 80 and a major portion of terminus 78.

Figure 10:
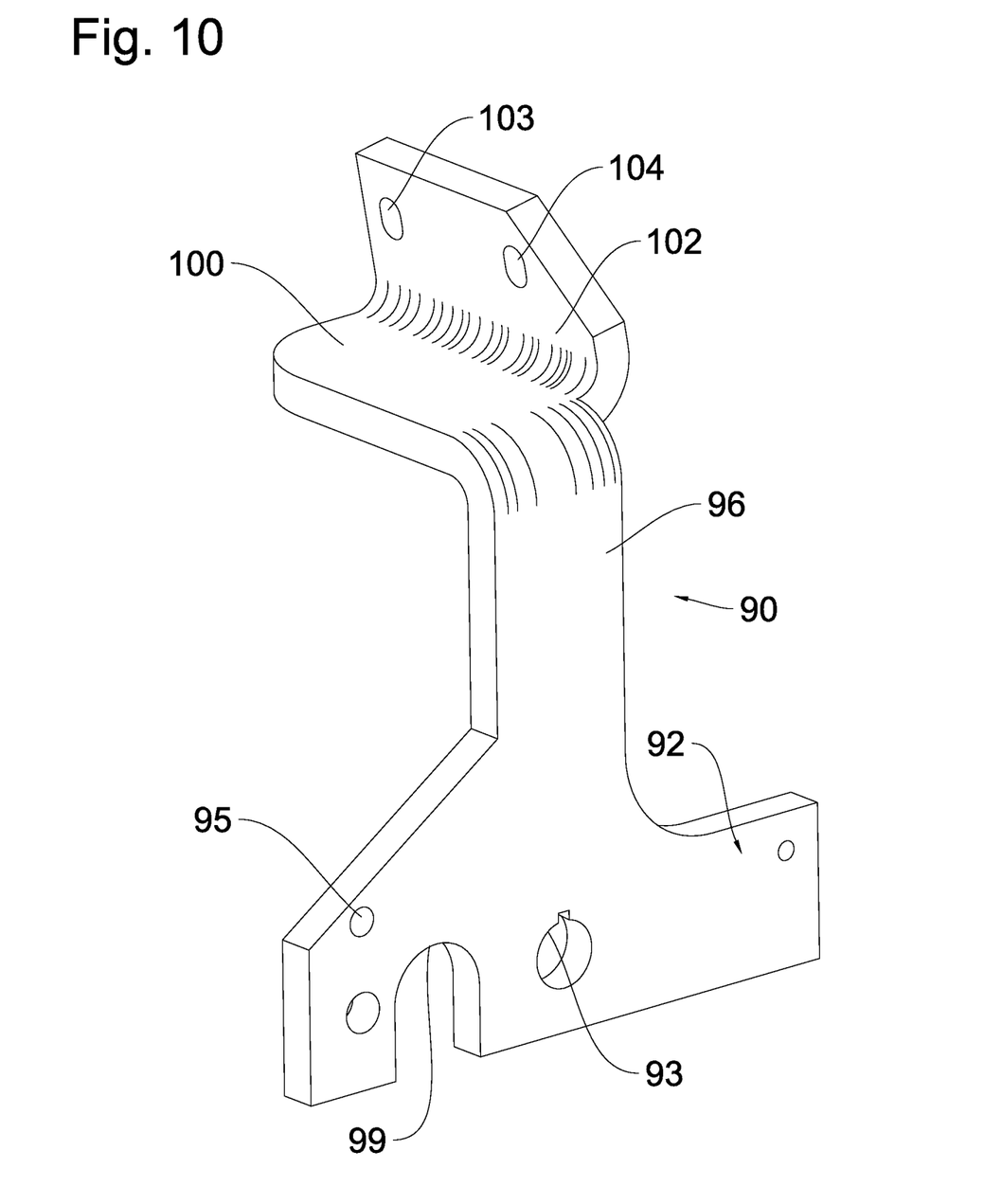
FIG. 10 is an enlarged isometric view of the preferred throttle lever.

With additional reference to FIG. 10, the throttle lever 90 preferably comprises a unitary, rigid, piece of metal. The lower foot 92 is substantially horizontally oriented in operation, spaced above and somewhat parallel to platform 64. The throttle control lever 90 is pivotally secured to the hydraulic pump 67 by a suitable fastener 94 (i.e., FIG. 4) that penetrates foot 92 through orifice 93. An integral, flat, substantially vertical leg portion 96 of the lever 90 extends vertically upwardly from foot 92. Fastener 91 (FIG. 4) that pivotally mounts linkage 88 to throttle lever 90 (FIG. 4) penetrates orifice 95 in foot 92 (FIG. 10). Clearance slot 99 permits passage of a hydraulic hose. The uppermost portion of throttle lever 90 comprises an in-turned, substantially horizontally oriented, integral top 100 that is oriented substantially parallel with platform 64. Top 100 supports an integral, substantially vertically oriented bridge 102 that comprises a pair of spaced apart terminal anchor holes 103 and 104 for securing ends of the throttle lever limit linkages 110, 111. The plane of bridge 102 is substantially perpendicular to the plane of the lever foot 92.

Figure 6:
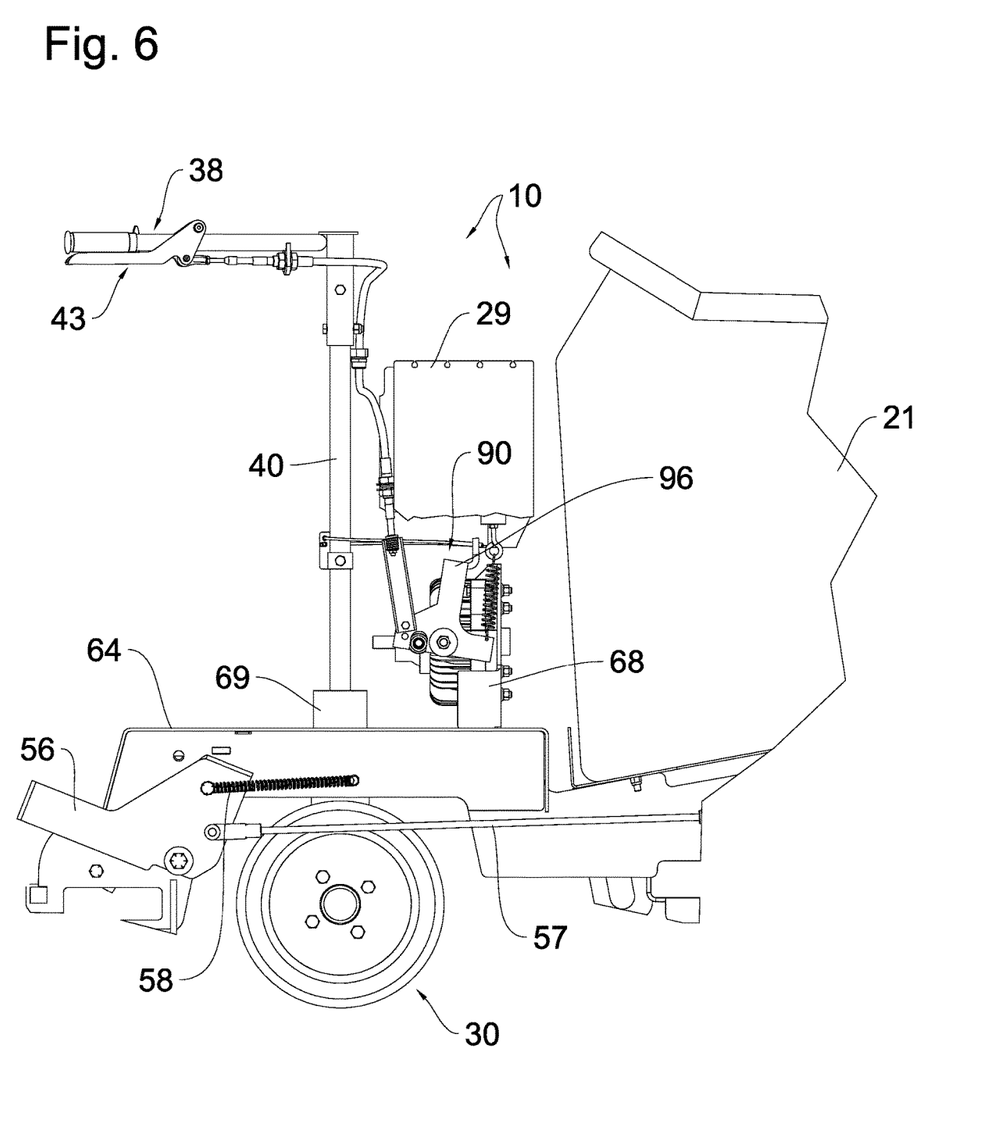
FIG. 6 is a fragmentary, side elevational view similar to FIG. 5, showing the throttle hand grip disposed in a fully "engaged" position, with the throttle lever partially displaced, and with the internal combustion engine omitted for clarity.
Figure 7:
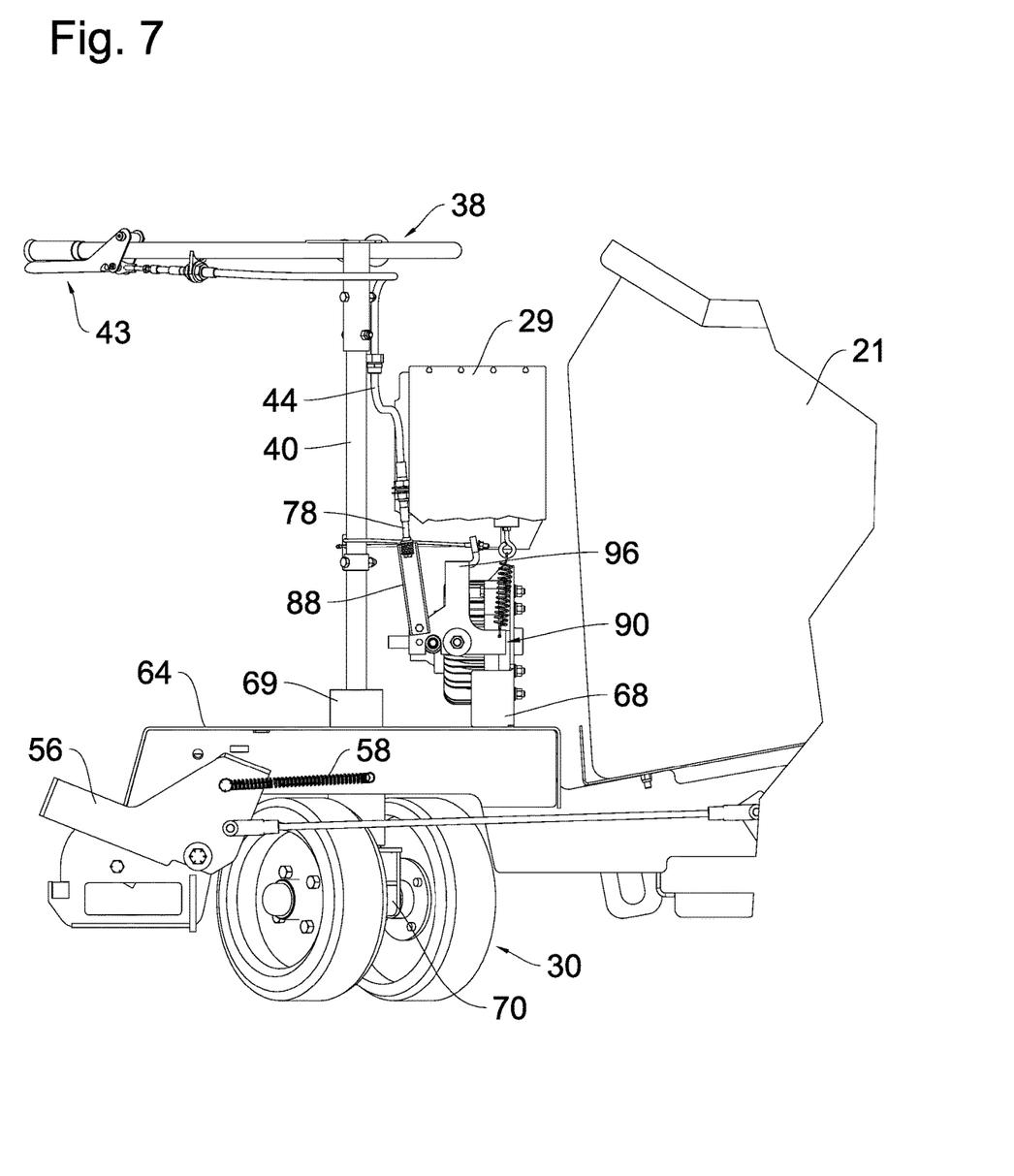
FIG. 7 is a fragmentary side elevational view similar to FIGS. 5 and 6, showing the throttle hand grip in a fully "engaged" position, with the cart turning sharply, and the throttle lever retracted somewhat from the position of FIG. 6.
Figure 8:
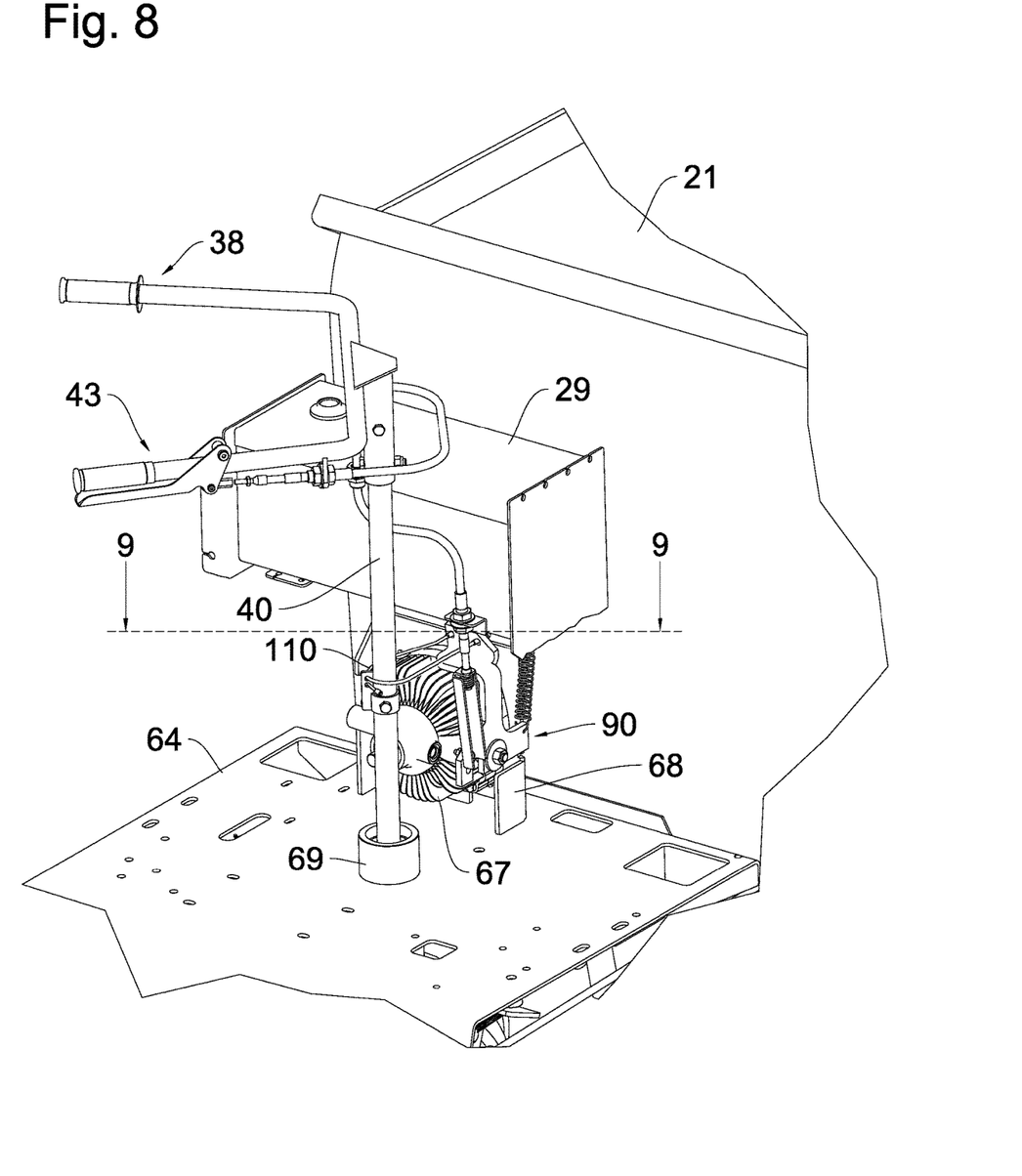
FIG. 8 is a fragmentary isometric view similar to FIG. 3, showing the cart turning.
Figure 9:
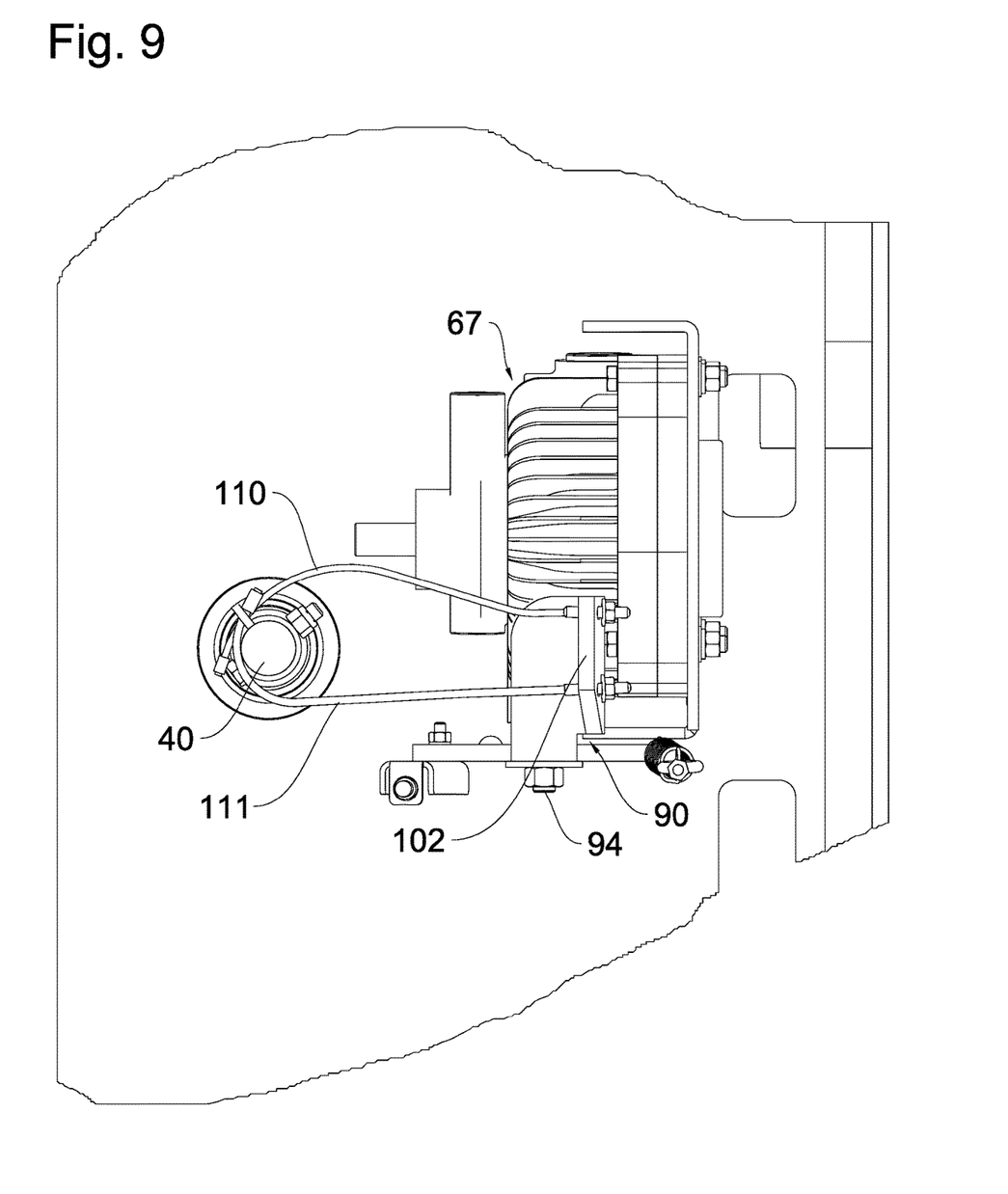
FIG. 9 is en enlarged, fragmentary sectional view taken generally along line 9-9 in FIG. 8.

The throttle cable 44 (i.e., FIG. 4) ultimately controls the throttle setting by pivoting lever 90 as it pulls upwardly on terminus 78 against limited pressure from spring 45. As the cable 40 pulls upwardly, the leg 96 and the upper flange 102 are deflected away from the steering shaft 40, and the hydraulic pump output pressure is increased. This deflection is seen in FIG. 6, wherein it is to be noted that the handle grip 43 is fully compressed. However, full speed deflection of the lever 90 is moderated by the throttle limit linkages 110, 111 that extend from a tubular anchor bracket 114 (FIG. 4). Anchor 114 (FIG. 4) comprises a tubular collar 116 coaxially mounted to steering column 40 by fastener 115 (FIG. 4) that penetrates steering column 40. Collar 116 comprises a pair of outwardly projecting flanges 117 to which limit linkages 110, 111 are connected. The limit linkages 110, 111 extend from anchor bracket flange portions 117 towards throttle lever 90, being received and fastened within terminal anchor holes 103, 104 in the bridge 102 of throttle lever 90 (FIGS. 4, 10). As the steering column rotates, the wire-like throttle limit linkages 110, 111 are wound radially about column 40, as seen in FIG. 9. As the linkages 110, 111 are thus shortened, the throttle lever 90 is tensioned and thus pivoted to a low-throttle position. Therefore, despite the chosen speed setting by the operator inputted by cable 44, large steering displacements and the resultant steering column rotation will retract the throttle lever 90 with the limit linkages 110 and/or 111 and reduce pump and cart speed.

Figure 11:
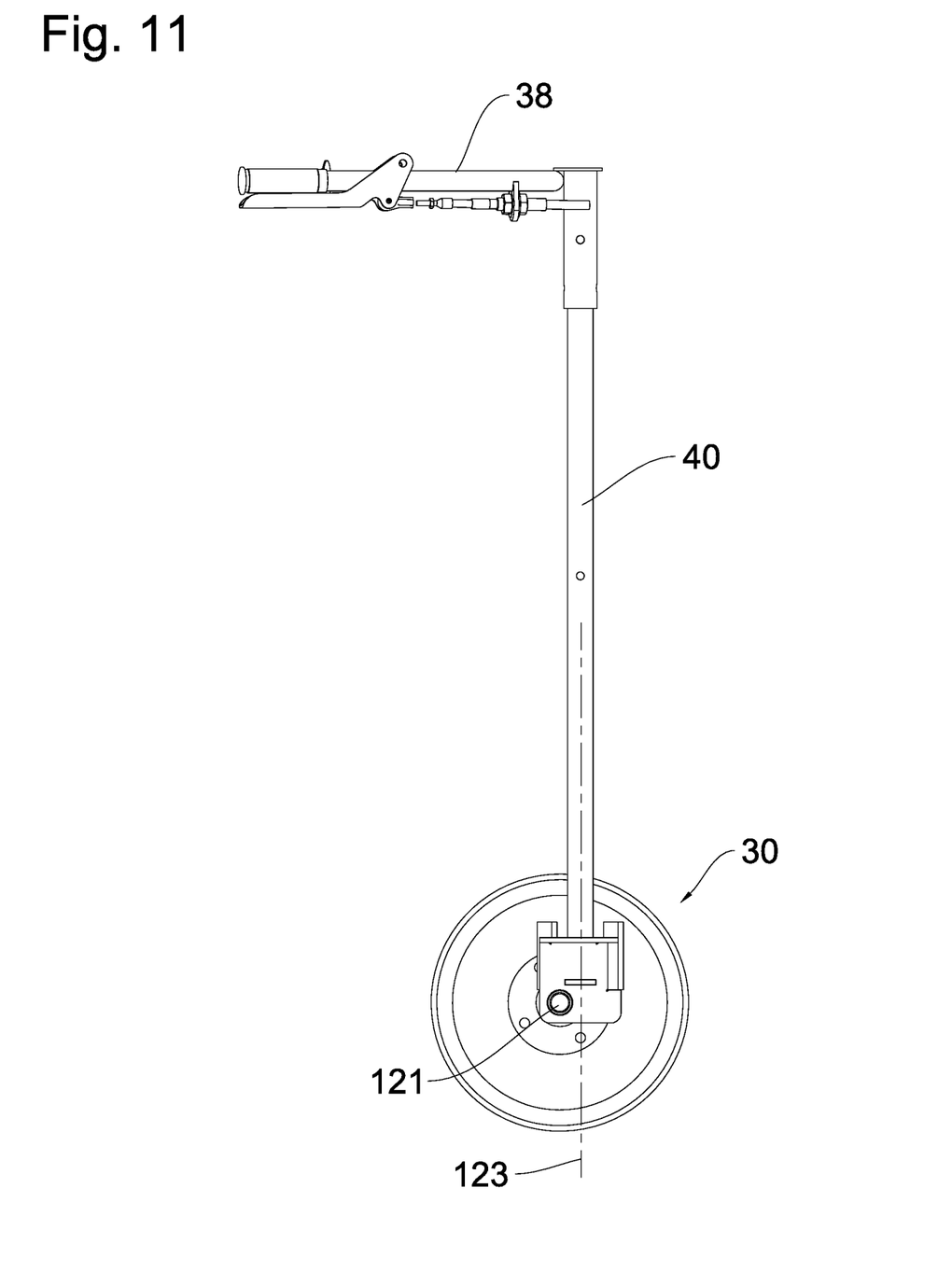
FIG. 11 is a diagrammatic view showing the preferred rear wheel caster arrangement; and, FIG. 12 is a simplified block diagram of the hydraulic drive motor arrangement.

Referencing FIG. 11, a preferred rear wheel arrangement establishes negative caster for stability. Although caster variation is, at present, an area of experimentation, it is thought that the ordinary caster of the rear wheels (which are not driven) should be negative for stability. To this extent it is seen that the center of rear wheel rotation at 121 (FIG. 11) is offset from the longitudinal axis 123 of the steering column 40.

Figure 12:
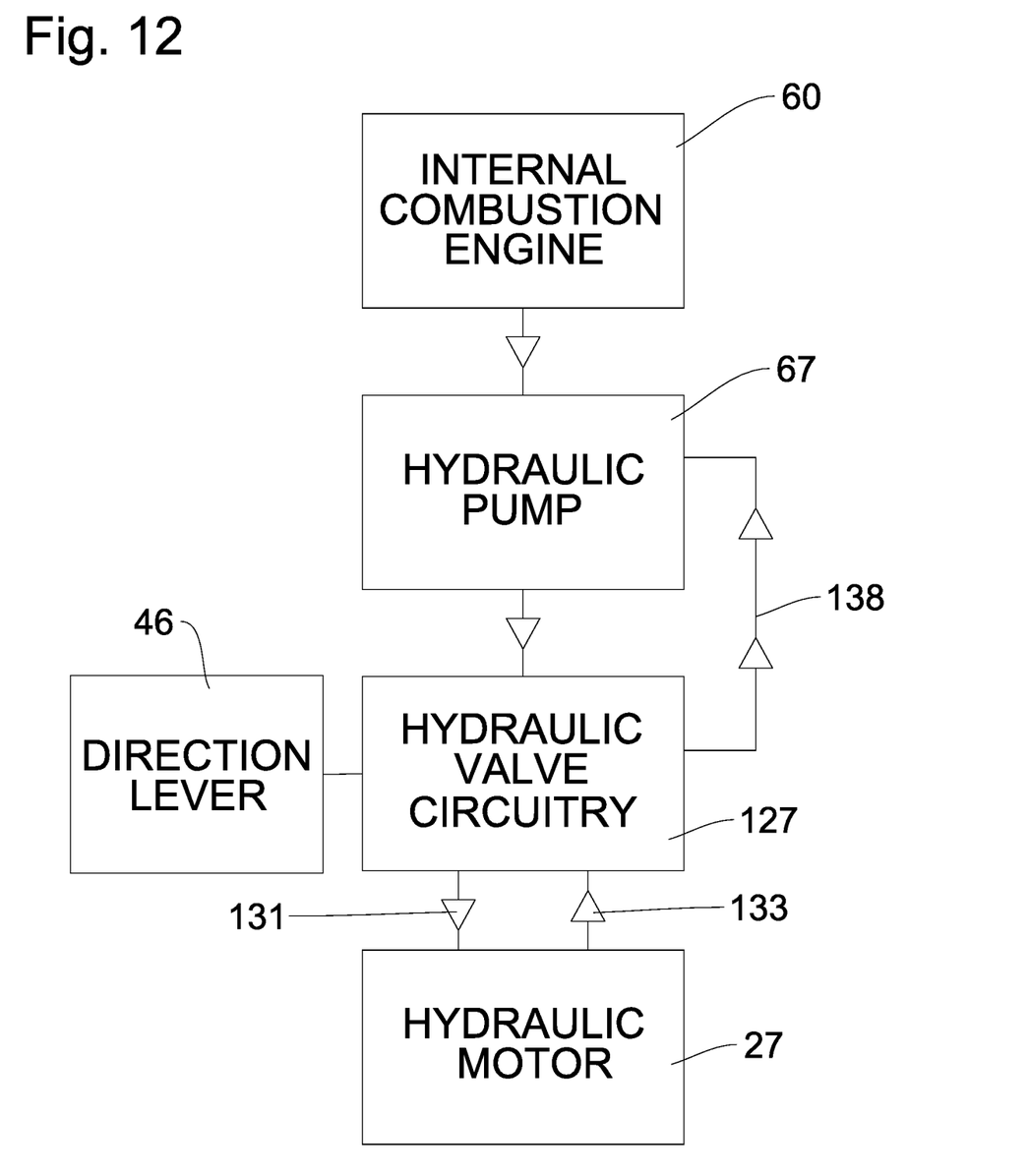

FIG. 12 shows a simplified block diagram of the hydraulic drive motor arrangement employed for drive motor control. The point is to reduce the cart speed automatically whenever going in reverse. The internal combustion engine 60 (FIG. 12) drives a conventional hydraulic pump 67 outputting through a conventional valve circuit 127 to hydraulic motor or motors 27. Direction of travel is controlled by a lever arrangement 46. Forward travel is established by line 131. Reverse travel is selected by proper lever selection causing flow on line 133. Speed reduction signals when in reverse are returned to the pump 67 via a feedback loop 138.

From the foregoing, it will be seen that this invention is one well adapted to obtain all the ends and objects herein set forth, together with other advantages which are inherent to the structure.

It will be understood that certain features and subcombinations are of utility and may be employed without reference to other features and subcombinations.

As many possible embodiments may be made of the invention without departing from the scope thereof, it is to be understood that all matter herein set forth or shown in the accompanying drawings is to be interpreted as illustrative and not in a limiting sense.

What is claimed is:

1. A self-propelled, steerable cart comprising:
   wheels supporting the cart, the wheels comprising at least one steered wheel and at least one driven wheel;
   an engine for powering the cart;
   a hydraulic motor for driving said at least one driven wheel;
   a hydraulic pump actuated by said engine that powers said hydraulic motor;
   a steering system adapted to be turned by a cart operator for steering said cart, wherein the steering system comprises an elongated steering column mechanically linked to said at least one steered wheel;
   a throttle control;
   a throttle lever pivotally linked to the hydraulic pump;
   an operating cable extending from the throttle control to the throttle lever for pivoting the throttle lever between speed increasing and speed decreasing positions; and,
   limit linkages extending from the steering system to the throttle lever for deflecting the throttle lever to lower and limit cart speed in response to predetermine steering deflections, wherein said limit linkages at least partially wind about said steering column in response to steering deflections.

2. The cart as defined in claim 1 wherein the throttle lever comprises an integral, foot pivoted to the hydraulic pump and a leg portion that
   extends vertically upwardly from said foot to an integral bridge with a pair of spaced apart terminal anchor holes for securing ends of the throttle lever limit linkages.

3. The cart as defined in claim 1 wherein the throttle control is mounted on said steering system, and wherein the steering system comprises handlebars adapted to be grasped by an operator for steering the cart, the handlebars operating a steering column mechanically linked to said at least one steered wheel.

4. The cart as defined in claim 3 wherein the throttle control comprises a hand grip mounted on said handlebars for controlling said operating cable.

5. The cart as defined in claim 4 wherein the steering system comprises an anchor collar coaxially secured to the steering column to which the limit linkages are secured.

6. A self-propelled, steerable batch cart for delivering loads of materials, the cart comprising:
   a cargo bucket for hauling and discharging loads;
   hydraulically powered drive wheels;
   separate wheels spaced apart from said drive wheels for steering the cart;
   an internal combustion engine for powering the cart;
   a hydraulic pump driven by the internal combustion engine;
   at least one hydraulic motor responsive to said hydraulic pump for actuating the drive wheels;
   a steering system accessible from an operator position that can be grasped and turned for actuating said wheels that steer the cart, the steering system comprising an elongated steering column mechanically linked to at least one of said wheels for steering said cart;
   a throttle lever pivoted to the hydraulic pump for controlling said hydraulic pump, the throttle lever pivotal between speed increasing and speed decreasing positions;
   an operator controlled cable extending to the throttle lever for selecting cart speeds;
   limit linkages extending from the steering system to the throttle lever for deflecting the throttle lever when predetermined steering limits are reached to decrease cart speed; and,
   an anchor mounted on the steering column for supporting the limit linkages.

7. The cart as defined in claim 6 wherein the steering system comprises handlebars linked to said steering column and wherein a hand grip is mounted on said handlebars for controlling said operating cable.

8. The cart as defined in claim 6 wherein the throttle lever comprises a foot pivoted to said pump and an integral leg portion that extends vertically upwardly from said foot to an integral bridge that comprises a pair of spaced apart terminal anchor holes for securing ends of the throttle lever limit linkages.

9. A self-propelled, steerable batch cart for delivering loads of materials, the cart comprising:
   a chassis;
   a cargo bucket pivotally supported by the chassis that can be hydraulically displaced between a load position and a tilted, load discharge position;
   front, hydraulically powered drive wheels and spaced apart, rear wheels for steering the cart;
   an internal combustion engine for powering the cart;
   a hydraulic pump driven by the internal combustion engine;
   at least one hydraulic motor responsive to said pump for actuating the drive wheels;
   a steering system accessible from an operator position that can be grasped and turned for actuating said wheels that steer the cart, wherein the steering system comprises an elongated steering column mechanically linked to at least one of said wheels for steering said cart;
   a throttle lever pivoted to said hydraulic pump for controlling said hydraulic pump, the throttle lever pivotal between speed increasing and speed decreasing positions;
   an operator controlled cable extending to the throttle lever for selecting cart speeds;
   a hand grip mounted on said steering system for controlling said throttle lever cable; and, limit linkages extending from a steering system anchor to the throttle lever for deflecting the throttle lever when predetermined steering limits are reached to decrease cart speed.

10. The cart as defined in claim 9 wherein the steering system comprises handlebars.

11. The cart as defined in claim 9 wherein the throttle lever comprises a foot pivoted to said pump and an integral, leg portion that extends vertically upwardly from said foot to an integral top, said top comprising an integral bridge that comprises a pair of spaced apart terminal anchor holes for securing ends of the throttle lever limit linkages.

12. The cart as defined in claim 11 wherein the steering system comprises handlebars.

* * * * *